United States Patent Office 3,271,243

Patented Sept. 6, 1966

1

2

3,271,243
STABLE CONCENTRATED BACTERIAL INSECTICIDE SUSPENSIONS

Helmuth Cords and Robert A. Fisher, Bakersfield, Calif., and John D. Briggs, Westerville, Ohio, assignors to International Minerals & Chemical Corporation, a corporation of New York No Drawing. Filed Mar. 13, 1963, Ser. No. 264,774
24 Claims. (Cl. 167—22)

This invention relates to the production of novel and highly useful concentrated bacterial insecticide suspensions.

The microbiological control of insects has long ago been suggested and, in recent years, there have come into some commercial use microbial insecticides derived from the cultivation, in appropriate aqueous nutrient media, of spore-forming bacilli of the type which produce live or viable spores and parasporal bodies in the form of crystalline inclusions. The most widely utilized spore-forming bacillus, for the production of said spores and their accompanying crystalline parasporal bodies, has been *Bacillus thuringiensis.* This spore-forming bacillus was isolated by E. Berliner from diseased larvae of the Mediterranean flour moth (Ztschr. f. das Gesam. Getreidewesen, 3, 63–70, 1911). Berliner described the organism as a gram positive, peritrichously flagellated spore-forming rod. On sporulation, the cells of the insect pathogen contain at one end a spore and at the other end a diamond-shaped crystal or parasporal body. A proteinaceous toxin identical in composition to the crystalline inclusion has been isolated from sporulated cultures of *Bacillus thuringiensis* (C. L. Hannay and P. Fitz-James, Can. J. Microb., vol. I, pp. 694–710, 1955). Other spore-forming bacilli which develop a parasporal body or a crystalline insect pathogen in the spores can also be utilized, noteworthy among them being *Bacillus sotto* (Nature, vol. 173, pp. 545, 546, 1954; Can. J. Microb., vol. 2, pp. 111–121, 1956); *Bacillus entomocidus* var. *entomocidus* (Proc. 10th Int. Congress Ent., Montreal, vol. 4, pp. 711–722, 1958); *Bacillus thuringiensis* var. *alesti*; (Compt. Rend, Acad. Sci. Paris, vol. 233, p. 1504, 1951); *Bacillus thuringiensis* var. *dendrolimus,* as well as others.

Various procedures are known in the art for the production of the insecticidal spore-parasporal bodies. These involve, generally speaking, cultivating the selected spore-forming bacillus in an aqueous nutrient medium containing assimilable carbohydrate and nitrogen under submerged aeration conditions. Suitable nutrient media include cane molasses, beet molasses, oil-free cottonseed endosperm flour, corn steep liquor solids, oil-free soya bean meal, oil-free corn meal, soya sauce, hydrolyzed corn products, autolyzed yeast, and the like. A buffer, commonly calcium carbonate, is used in the medium.

While this invention is in no way dependent upon the particular manner in which the insecticidal spore-parasporal bodies are produced, a particularly satisfactory procedure which has heretofore been commercially utilized is that disclosed in John C. Megna Patent No. 3,073,749, dated January 15, 1963. As there described, by way of example, an aqueous nutrient medium containing about 1.86% beet molasses, about 1.4% oil-free cottonseed endosperm flour (Pharmamedia), about 1.7% corn steep liquor solids and 0.1% calcium carbonate is formed, the pH adjusted to within the range of 7.2 to 7.6, batch sterilized for 20 to 30 minutes at 121 degrees C., and then inoculated with about 5% of its volume of a culture of *Bacillus thuringiensis.* The culturing process is preferably run with about 5 p.s.i.g. back pressure with a superficial velocity of about 5.3 ft./min. at the sparger with agitation and at an incubation temperature of about 30 degrees C. The pH drops from an initial value of about 7.2–7.6 to about 6.4–6.6 and then rapidly rises to about 7.5–8.5. Bacterial cell counts per $cm.^3$, particularly where fermentation media are employed such as those containing about 1.86% beet or cane molasses, 1.4% Pharmamedia, 1.7% corn steep liquor solids, and 0.1% calcium carbonate, reach about 2 to $5 \times 10^9$ and ordinarily approximately 3 to 7 hours after maximum growth has been reached sporulation commences. Such sporulation then proceeds at a relatively constant rate for about 5 to 10 hours after peak growth and relatively little cell lysis occurs before this time. The culturing period will ordinarily range from about 14 to about 32 hours with about 16 to 20 hours being generally the optimum. Recovery of the spores and the accompanying parasporal bodies is carried out by adding a filter aid, such as Celite 512 in appropriate amount, for instance 2%, filtering through a pressure filter, and drying the filter cake in a forced circulation or vacuum drier at 40–50 degrees C. Final powders are obtained, after grinding, commonly containing of the order of 96.7% solids and a spore count of the order of 15 to $35 \times 10^9$ per gram. Where Celite or other filter aids are not used, final dried products are obtained in which the spore counts are several times greater.

For field and forest use, efforts were heretofore made to convert the bacterial insecticides into oil-water suspensions. This was done, for example, by ball milling of powders, produced as described above, in admixture with xylene or diesel oils or other liquid hydrocarbons, the resulting ball-milled products being emulsified with water and a small proportion of af emulsifying agent. Such suspensions, however, were found to be unsatisfactory from a number of standpoints. In the first place, their insecticidal potencies were on the low side. In the second place, their physical stabilities over even a reasonable period of time, unless the ball milling was very prolonged, were not consistent and were not satisfactory. Thirdly, they were subject to the development of extremely strong odors or malodors in storage at normal temperatures over reasonable periods of time. Through the use of certain other types of grinding equipment, the time of grinding the mixture of hydrocarbon oil, such as a diesel oil, and the powdered spore-parasporal bodies could be reduced appreciably but the operation was found to be uneconomical and, in addition, difficulties were encountered in connection with the maintenance in suspension of the solid spore-parasporal bodies in the oil as well as in the emulsifiable concentrates produced therefrom. In addition, the emulsifiable concentrates were subject to the same objections as those referred to above from the standpoints of insecticidal potencies and development of malodors.

The present invention is based upon a number of discoveries which overcome the aforementioned objections and make feasible and practicable the manufacture, marketing and use of bacterial insecticides, of the type described heretofore, in the form of concentrated suspensions. Certain correlative discoveries have been made which are important more generally in the manufacture and use of said bacterial insecticides.

It has been found, in the first place, that if, instead of using previously dried, for instance, vacuum drum dried, bacterial insecticide powders for the production of the suspensions, one employs a non-dried cell cream or non-dried cell sludge derived from the final whole culture in the process of producing the bacterial insecticide, not only is the expense of the drying step eliminated but, in addition, very substantial increase in insect activity is obtained. In other words, the use of the non-dried cell cream or cell sludge brings about marked economic savings in that the production procedure of preparing the concentrated suspensions is considerably shortened due, among other things, to the elimination of the drying steps, and, in addition, the marked losses, in some cases of the magnitude of 60–80% or more, in insect activity occasioned by the drying procedure are eliminated. Furthermore, by reason of the elimination of the necessity for ball milling or like grinding operations in the production of suspensions by previously utilized procedures, final concentrated suspensions are obtained simply and easily with excellent stability so far as sedimentation of dried solids and insect activity are concerned.

It has, further, been discovered, pursuant to the present invention, that, in shipment and storage of the suspensions of bacterial insecticides, inhibition of the development of objectionable odors is obtained if the pH thereof is adjusted to lie within a certain upper limit. In this connection, for instance, if a concentrated suspension is made containing *Bacillus thuringiensis* spores (and parasporal bodies), water, a liquid hydrocarbon and an emulsifying agent, at a pH of 7, after storage for two weeks at 37 degrees C., extremely strong odors or malodors develop even though there is no increase in vegetative cells. Addition of various conventional fungistatic and bacteriostatic compounds does not serve to inhibit the formation of such malodors. If, however, the pH of such suspensions is adjusted to not above 5.5 and, better still, not above 4.5, and particularly advantageously between 3.5 and 4.5, the development of malodors is strongly inhibited. Acidities lower than pH 3 or 3.5, while operative, are not preferred since they may introduce problems of corrosion of equipment.

It has, additionally, been discovered that the development of malodors is also markedly reduced or inhibited if there is incorporated into the baterial insecticide suspensions small proportions of one or more water-soluble metal (including ammonium) salts. Such salts include, by way of example, chlorides, bromides, acetates, sulfates and nitrates of sodium, potassium, ammonium, lithium, calcium, magnesium, aluminum and iron. It is preferred to utilize water-soluble alkali metal (including ammonium), alkaline earth metal and aluminum chlorides and sulfates, or mixtures of such salts. The percentages of said salts are, to some extent, variable, but they are in all cases small in amount but sufficient to inhibit production of malodors. Generally speaking, the percentages of said salts will not exceed 10% by weight of the concentrate and will usually lie in the range of about 4 to 7% with about 5% representing a good general average. Particularly satisfactory is sodium chloride in the range of 4 to 6 or 7%.

It is especially advantageous, for best results, to utilize the aforementioned pH control conjointly with the use of sodium chloride or other water-soluble metal salts.

The oleaginous constituent of the concentrated suspensions of the present invention can be of vegetable, animal or mineral origin as, for instance, cottonseed oil, corn oil, soya bean oil, castor oil, whale oil, or the like but, for reasons of economy and for other reasons as well, it will usually be a normally liquid hydrocarbon or petroleum distillate or cut or fraction of relatively low volatility, that is, having a flash point in excess of 80 degrees F. and, better still, in excess of 100 degrees F. Examples of normally liquid hydrocarbons suitable for use in the production of concentrated suspensions pursuant to the present invention are kerosene (preferably deodorized kerosene), xylenes, various mineral oils such as diesel oils, methylated napthalenes, and other oleaginous liquids which are conventionally used in the insecticidal art for producing concentrated insecticidal suspensions. The amounts of such oleaginous constituent, based upon the volume of the concentrates or emulsifiable concentrates, are quite variable. In general, they will range from about 2 to 30% with a good average being from about 5 to 10 or 25%.

The concentrated suspensions of the present invention advantageously contain an emulsifier (or dispersing agent) in the form of a single emulsifying agent or an emulsifier composition comprising a mixture of emulsifying agents. The emulsifiers may be of anionic, nonionic or cationic character. They are, per se, well known in the art and no novelty is claimed in the selection of any particular one or ones for use in the compositions of the present invention. Illustrative examples of them are "Tween 80" (Atlas Chemical Company), isooctyl phenyl polyoxyethanol ("Triton X–100," Rohm & Haas Company), blends of alkyl aryl polyether alcohols with organic sulfonates ("Triton X–151," "Triton X–161," and "Triton X–171," Rohm & Haas Company), salts of sulfonated animal, vegetable and mineral oils such as sodium and amine salts of sulfonated castor oil, sulfonated fish oils and sulfonated petroleum oils, sodium lauryl sulfate, and such emulsifying agents as are disclosed, for instance, in such illustrative U.S. patents as Nos. 2,722,478; 2,731,338; 2,756,135; 2,898,267; 2,976,209; 2,976,211; and Re. No. 24,184. Where used, they will ordinarily be employed in proportions of the order of 0.1 to 1%, by weight, of the concentrated suspensions, preferably in the range of 0.3 to 0.8%.

In the broader aspects of the present invention, various of the concentrated suspensions of the present invention do not require an emulsifier since relatively homogeneous compositions are obtainable upon dilution or admixture with water without an extraneous emulsifier, depending upon the particular liquid oleaginous material used and depending upon how soon after preparation the concentrated suspension is to be used in the field and the character of equipment available in the field for application of said suspension, after dilution with water, to the areas to be treated.

Furthermore, the bacterial insecticidal cell cream or sludge, stabilized against development of malodors, can be used for the production of aqueous dispersions, without any oleaginous constituent being present although, generally speaking, it will be preferable to include in such aqueous dispersions small percentages, usually of the order of 0.5 to 2% by weight, of wetting or dispersing agents which, per se, are well known in the art and of which the aforementioned emulsifying agents are illustrative or typical examples. The particularly important aspects of this invention, however, center around the concentrated suspensions containing the aforementioned cell creams or sludges in conjunction with xylene, diesel type oils or low volatile petroleum oils or distillates, and an emulsifier.

The following examples are illustrative of the production of compositions in accordance with the present invention. Other specific embodiments will readily occur to those skilled in the art in the light of the guiding teachings and principles disclosed herein.

A. To 15 volumes of a final whole culture, such as is produced in accordance with the procedure described above, dilute acid (hydrochloric or sulfuric) was added in amount to produce pH 4, and the resulting acidified culture was then screened through a screen having 150 meshes to the square inch. The resulting screened culture was then centrifuged in a Sharples centrifuge (other desludging devices may be used) whereupon a cell cream or sludge constituting about 0.6 volume (based upon the original 15 volumes of starting final whole culture) was obtained, the remainder constituting liquid effluent. The cell cream or sludge, which had the approximate consistency of mayonnaise, was mixed with ½ its weight of said effluent to produce a simulated cell sludge of relatively free flowing consistency containing approximately 20%, by weight, of water-insoluble solids. Sodium chloride was then added in an amount to constitute 5% by weight of said simulated sludge. The following suspensions and other concentrates were prepared from said bacterial insecticide simulated sludge, parts being by volume (except as otherwise expressly stated) except for the emulsifier which is stated in terms of percentage by weight of the concentrate:

Example 1

| | Parts, percent |
|---|---|
| Bacterial insecticide simulated cell sludge | 3 |
| Diesel oil (No. 2) | 1 |
| Emulsifier ("Triton X-100") | 0.4 |

This composition contained about 15%, by weight, of water-insoluble solids and a viable spore count of $30 \times 10^9$ per gram. A spray mix made from 1 part of said composition and 4 parts of water remained stable against sedimentation of solids for several hours with little or no agitation. The admixture, by volume, of 2 parts of the concentrated suspension of this Example 1 with 1 part of water and 1 part of diesel oil (No. 2) yields a sprayable mix containing about 37.5% oil for forest application.

The concentrated suspension of this Example 1, at pH 4, did not develop malodors for more than 7 days at 37 degrees C. In sharp contrast thereto, otherwise the same suspension but at pH 7 developed malodors within 2 days. In similar tests of the concentrated suspensions, one at pH 4 and the other at pH 7, but in which bacteriostatic agents such as "Lysol," "Clorox" and "Roccal" (higher alkyl dimethyl benzyl ammonium chloride, Sterwin Chemicals, Inc.), were added, malodors developed within 2 days at pH 7; whereas at pH 4 malodors did not develop for 7 days or more. The addition of 5% by weight of sodium chloride materially enhanced stability against development of malodors in both the pH 7 and pH 4 simulated sludge and, in addition, checked the upward drift of pH in the pH 4 simulated sludge.

Example 2

| | Parts, percent |
|---|---|
| Bacterial insecticide cell sludge | 3 |
| Diesel oil | 2.5 |
| Water | 1.5 |
| Emulsifier | 0.15 |

This composition contained about 8.5%, by weight, of water-insoluble solids.

Example 3

| | Parts |
|---|---|
| Bacterial insecticide cell sludge | 100 |
| Xylene | 5 |

This composition contained about 20%, by weight, of insoluble solids. For use, one volume may be diluted with 4.2 volumes of water to produce a composition for spraying, the diluted composition containing about 1% xylene and about 4% of insoluble solids.

Example 4

| | Parts |
|---|---|
| Bacterial insecticide simulated cell sludge | 100 |
| Xylene | 2 to 5 |
| "Triton X-100" | 0.8 |

For field application, this composition may be diluted with 4 volumes of water.

Example 5

| | Parts |
|---|---|
| Bacterial insecticide simulated cell sludge | 100 |
| Sodium chloride | 5 |

Example 6

| | Parts |
|---|---|
| Bacterial insecticide simulated cell sludge | 100 |
| Xylene | 5 |
| Sodium chloride | 5 |

The bacterial insecticide concentrate compositions of the present invention may, if desired, contain various supplemental ingredients. Thus, for instance, there may be added thereto small proportions of sticking or adhesive agents such as glue or rosen to increase the property of adherence of the compositions, after dilution with water, to the plant surfaces or the like to which said diluted compositions are applied. Again, the concentrate compositions may have added thereto small proportions, of the order of 1 to 2%, of odorous or odor masking materials of various types, an illustrative example of which is naphthalene. Furthermore, other insecticidal materials may be incorporated into the concentrate compositions to obtain multipurpose effects.

The bacterial insecticide concentrates of the present invention can be used for the treatment and eradication of insect pests in field and forest. Thus, the concentrated suspensions, suitably diluted with water, can be used effectively, for instance, in controlling such pests as Gypsy moth, cabbage looper, alfalfa caterpillar, Spruce budworm and Black-headed budworm, and a host of other pests. The compositions, in the form of aqueous dispersions or suspensions can be used effectively against the corn borer. Among the numerous crops in the protection of which the compositions of the present invention are useful are, by way of example, alfalfa, artichoke, cabbage, cauliflower, broccoli, celery, cotton, lettuce, grapes, peas, beans, potatoes, corn and tobacco.

What we claim as new and desire to protect by Letters Patent of the United States is:

1. In a method of preparing concentrates of bacterial insecticides derived from culturing an insecticidal-producing spore-forming microorganism of the type which both sporulates and also forms crystals in an aqueous nutrient medium, the steps which comprise producing a cell sludge from the final whole culture without passing through the drying stage, said sludge having a pH not in excess of 5.5, and then admixing said sludge with a liquid oleaginous material.

2. In a method of preparing concentrates of bacterial insecticides derived from culturing *Bacillus thuringiensis* in an aqueous nutrient medium, the steps which comprise producing a cell sludge from the final whole culture without passing through the drying stage, said sludge having a pH in the range of about 3.5 to 4.5 and then admixing said sludge with a liquid hydrocarbon and an emulsifying agent.

3. In a method of preparing concentrates of bacterial insecticides derived from culturing an insecticidal-producing spore-forming microorganism of the type which both sporulates and also forms crystals in an aqueous nutrient medium, the steps which comprise desludging the final whole culture and adjusting the pH to provide an aqueous cell sludge having a pH of about 3.5 to 4.5.

4. In a method of preparing concentrates of bacterial insecticides derived from culturing *Bacillus thuringiensis* in an aqueous nutrient medium, the steps which comprise desludging the final whole culture and adjusting the pH to provide an aqueous cell sludge having a pH of about 4, and incorporating a liquid hydrocarbon to provide a concentrate which is dilutable with water.

5. In a method of preparing concentrated suspensions of bacterial insecticides derived from culturing *Bacillus thuringiensis* in an aqueous nutrient medium, the steps which comprise desludging the final whole culture and adjusting the pH to provide an aqueous cell sludge having a pH of about 3.5 to 4.5 and incorporating a liquid hydrocarbon and an emulsifying agent to provide a stable substantially homogeneous suspension which is dilutable with water.

6. In a method of preparing emulsifiable concentrates of bacterial insecticides derived from culturing *Bacillus thuringiensis* in an aqueous nutrient medium, the steps which comprise adjusting the pH of the final whole culture to within the range of about 3.5 to 4.5, screening and desludging to provide an aqueous cell sludge, and incorporating a liquid hydrocarbon, from 4 to 10%, by weight of said concentrate, of a water-soluble metal salt, and an emulsifying agent to provide a stable substantially homogeneous suspension which is dilutable with water.

7. A method in accordance with claim 6, in which the metal salt is sodium chloride.

8. In a method of improving the stability against formation of malodors in cell creams derived from culturing an insecticidal-producing spore-forming microorganism of the type which both sporulates and also forms crystals in an aqueous nutrient medium, the steps which comprise separating said cell cream from the final whole culture and adjusting the pH to provide an aqueous cell cream having a pH not exceeding 5.5.

9. In a method of improving the stability against formation of malodors in cell creams derived from culturing *Bacillus thuringiensis* in an aqueous nutrient medium, the steps which comprise adjusting the pH of the final whole culture to within the range of about 3.5 to 4.5, screening said pH adjusted final whole culture to remove solid particles having a mesh size greater than those which pass a 100 mesh screen, and then separating the cell cream from said screened final whole culture.

10. In a method of improving the stability against formation of malodors in concentrated suspensions prepared from non-dried cell creams derived from culturing *Bacillus thuringiensis* in an aqueous nutrient medium, the steps which comprise adjusting the pH of the non-dried aqueous cell cream to about 3.5 to 4.5, and then preparing a formulated product therefrom by admixing said cell cream with a liquid hydrocarbon and an emulsifying agent.

11. In a method of improving the stability against formation of malodors in insecticidal materials derived from culturing an insecticidal-producing spore-forming microorganism of the type which both sporulates and also forms crystals in an aqueous nutrient medium, the steps which comprise providing an aqueous suspension of said insecticidal materials containing live spores and associated parasporal bodies, and adjusting the pH thereof to about 3.5 to 4.5.

12. A stable bacterial insecticide concentrate comprising (a) a non-dried cell sludge recovered from a final whole culture derived from culturing an insecticidal-producing spore-forming microorganism of the type which both sporulates and also forms crystals in an aqueous nutrient medium, the pH of said sludge having been adjusted to lie within the range of about 3.5 to 4.5, and (b) a liquid oleaginous material.

13. A stable bacterial insecticide concentrate comprising (a) a non-dried cell sludge recovered from a final whole culture derived from culturing an insecticidal-producing spore-forming microorganism of the type which both sporulates and also forms crystals in an aqueous nutrient medium, the pH of said sludge having been adjusted to not in excess of 5.5, (b) a liquid hydrocarbon, and (c) an emulsifying agent.

14. A stable bacterial insecticide concentrate comprising (a) a non-dried cell sludge recovered from a final whole culture derived from culturing *Bacillus thuringiensis* in an aqueous nutrient medium, the pH of said sludge having been adjusted to lie within the range of about 3.5 to 4.5 (b) a liquid hydrocarbon, and (c) an emulsifying agent.

15. A stable bacterial insecticide concentrate comprising (a) a non-dried cell sludge recovered from a final whole culture derived from culturing an insecticidal-producing spore-forming microorganism of the type which both sporulates and also forms crystals in an aqueous nutrient medium, the pH of said sludge having been adjusted to not in excess of 5.5, (b) a liquid hydrocarbon, (c) from about 4 to 10% of a water-soluble metal salt, and (d) an emulsifying agent.

16. A stable bacterial insecticide concentrate comprising (a) a non-dried cell sludge recovered from a final whole culture derived from culturing *Bacillus thuringiensis* in an aqueous nutrient medium, the pH of said sludge having been adjusted to lie within the range of about 3.5 to 4.5, (b) a liquid hydrocarbon, (c) from about 4 to 7% of sodium chloride, and (d) an emulsifying agent.

17. A stable bacterial insecticide concentrate comprising (a) an aqueous suspension of an insecticidal material comprising live spores and associated parasporal bodies derived from culturing *Bacillus thuringiensis* in an aqueous nutrient medium, the pH of said aqueous suspension having been adjusted to not in excess of 5.5, (b) a liquid hydrocarbon, and (c) from about 4 to 10% sodium chloride.

18. A stable bacterial insecticide concentrate comprising (a) a non-dried cell cream recovered from a screened final whole culture derived from culturing *Bacillus thuringiensis* in an aqueous nutrient medium, the pH of said cell cream being from 3.5 to 4.5, (b) a liquid petroleum hydrocarbon, (c) an emulsifying agent, and (d) from 4 to 10%, by weight of said concentrate, of a water-soluble metal salt.

19. A stable bacterial insecticide concentrate comprising (a) a non-dried cell cream recovered from a screened final whole culture derived from culturing an insecticidal-producing spore-forming microorganism of the type which both sporulates and also forms crystals in an aqueous nutrient medium, the pH of said cell cream being not in excess of 5.5, and (b) from 4 to 10%, by weight of said concentrate, of a water-soluble metal salt to inhibit development of malodors in said concentrate.

20. A concentrate in accordance with claim 19, in which the water-soluble metal salt is selected from the class consisting of alkali metal, alkaline earth metal and aluminum chlorides and sulfates.

21. A stable bacterial insecticide concentrate comprising a non-dried cell sludge recovered from a final whole culture derived from culturing an insecticidal-producing spore-forming microorganism of the type which both sporulates and also forms crystals in an aqueous nutrient medium, the pH of said sludge not exceeding 5.5.

22. A stable bacterial insecticide concentrate comprising a non-dried cell sludge recovered from a final whole culture derived from culturing *Bacillus thuringiensis* in an aqueous nutrient medium, the pH of said sludge being in the range of from about 3.5 to 4.5.

23. A stable bacterial insecticide concentrate comprising (a) an aqueous suspension of an insecticidal material comprising live spores and associated parasporal bodies derived from culturing an insecticidal-producing spore-forming microorganism of the type which both sporulates and also forms crystals in an aqueous nutrient medium, the pH of said aqueous suspension being in the range of about 3.5 to 4.5, and (b) from 4 to 10%, by weight of said concentrate, of an added water-soluble metal salt selected from the class consisting of alkali metal, alkaline earth metal and aluminum chlorides and sulfates to inhibit development of malodors in said concentrate.

24. A stable bacterial insecticide concentrate comprising (a) a non-dried cell cream recovered from a screened final whole culture derived from culturing *Bacillus thuringiensis* in an aqueous nutrient medium, the pH of said cell cream being about 3.5 to 4.5, and (b) from about 4 to 10%, by weight of said concentrate, of sodium chloride to inhibit development of malodors in said concentrate.

References Cited by the Examiner

UNITED STATES PATENTS

| | | | |
|---|---|---|---|
| 2,990,330 | 6/1961 | Gattani | 167—22 |
| 3,021,262 | 2/1962 | Perlman | 195—96 |
| 3,087,865 | 4/1963 | Drake et al. | 195—96 |

OTHER REFERENCES

Frear: Chemistry of Insecticides, Fungicides, and Herbicides, 2d ed., 1948, pp. 189–202.

Science, vol. 129, No. 3348, Feb. 27, 1959, pp. 537, 541.

JULIAN S. LEVITT, *Primary Examiner.*

GEORGE A. MENTIS, *Assistant Examiner.*